(12) United States Patent
Benton et al.

(10) Patent No.: US 7,211,550 B2
(45) Date of Patent: *May 1, 2007

(54) COMPOSITIONS FOR CONTROLLING SCALING AND COMPLETION FLUIDS

(75) Inventors: William J. Benton, Magnolia, TX (US); Neal F. Magri, Katy, TX (US); James R. VonKrosigk, Nixon, TX (US); Michael T. Pelletier, Houston, TX (US)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/900,533

(22) Filed: Jul. 6, 2001

(65) Prior Publication Data

US 2002/0117457 A1 Aug. 29, 2002

Related U.S. Application Data

(60) Provisional application No. 60/252,200, filed on Nov. 21, 2000, provisional application No. 60/229,691, filed on Sep. 1, 2000, provisional application No. 60/218,382, filed on Jul. 14, 2000.

(51) Int. Cl.
*C09K 8/52* (2006.01)

(52) U.S. Cl. .................. 507/267; 507/203; 507/241; 507/254; 507/260; 507/261; 507/277; 507/219; 507/224; 507/925; 507/927; 166/312

(58) Field of Classification Search ............... 507/241, 507/203, 267, 277, 103, 219, 224, 260, 261, 507/254, 925, 927; 166/312

See application file for complete search history.

(56) References Cited

U.S. PATENT DOCUMENTS

| 4,292,183 A | 9/1981 | Sanders | 252/8.55 |
| 4,440,649 A | 4/1984 | Loftin et al. | 252/8.5 |
| 4,519,923 A | 5/1985 | Hori et al. | 252/8.5 C |
| 4,536,297 A | 8/1985 | Loftin et al. | 252/8.5 C |
| 4,647,859 A | 3/1987 | Son et al. | 324/323 |
| 4,900,457 A | 2/1990 | Clarke-Sturman et al. | 252/8.514 |
| 5,093,020 A * | 3/1992 | Paul et al. | 134/22.14 |
| 5,184,679 A * | 2/1993 | Lau | 507/241 |
| 5,366,016 A * | 11/1994 | Fieler et al. | 166/312 |
| 5,379,840 A | 1/1995 | Cowan et al. | 166/292 |
| 5,620,947 A | 4/1997 | Elward-Berry | 507/229 |
| 5,635,458 A | 6/1997 | Lee et al. | 507/240 |
| 5,708,107 A | 1/1998 | Ahmed et al. | 526/263 |
| 5,723,416 A | 3/1998 | Liao | 507/110 |
| 5,785,747 A | 7/1998 | Vollmer et al. | 106/194.2 |
| 5,804,535 A | 9/1998 | Dobson et al. | 507/111 |
| 5,855,244 A | 1/1999 | Ahmed et al. | 166/295 |
| 5,962,375 A | 10/1999 | Sawdon et al. | 507/140 |
| 6,006,831 A | 12/1999 | Schlemmer et al. | 166/250.01 |
| 6,015,535 A | 1/2000 | Brown et al. | 423/179 |
| 6,100,222 A | 8/2000 | Vollmer et al. | 507/113 |
| 6,124,244 A | 9/2000 | Murphey | 507/111 |
| 6,127,319 A | 10/2000 | House | 507/110 |
| 6,137,005 A | 10/2000 | Hjørnevik | 562/609 |
| 6,156,708 A | 12/2000 | Brookey et al. | 507/102 |
| 6,177,014 B1 | 1/2001 | Potter et al. | 210/651 |
| 6,194,355 B1 | 2/2001 | Jarrett et al. | 507/140 |
| 6,239,081 B1 | 5/2001 | Korzilius et al. | 507/145 |
| 6,248,700 B1 | 6/2001 | Vollmer et al. | 507/277 |
| 6,340,712 B1 * | 1/2002 | Kunin et al. | 521/26 |
| 6,656,989 B1 | 12/2003 | Benton et al. | 524/394 |
| 6,818,595 B2 * | 11/2004 | Benton et al. | 507/103 |
| 2001/0036905 A1 * | 11/2001 | Parlar et al. | 507/200 |

FOREIGN PATENT DOCUMENTS

| EP | 0137872 | 4/1985 |
| EP | 0259939 | 3/1988 |
| EP | 0572113 | 9/1995 |
| GB | 2277338 | 10/1994 |
| GB | 2290815 | 10/1996 |
| GB | 2314865 | 1/1998 |
| WO | WO 90/11972 | 10/1990 |

(Continued)

OTHER PUBLICATIONS

Howard, S.K., Annu. Spe. Tech. Conf., "Formate Brines for Drilling and Completion: State of the Art," (Dallas, Oct. 22-25, 1995) PROC (Drilling and Completion), pp. 483-496, 1995, (SPE-30498; 13 Refs).

(Continued)

*Primary Examiner*—Philip C. Tucker

(57) ABSTRACT

An aqueous-based composition containing cesium formate and at least one chelating agent is described. Methods of removing scaling deposits, which may include alkaline earth metal sulfates, present on surfaces, including porous media, such as alkaline earth metal sulfate buildup in a well bore, is also described, wherein the method includes contacting the alkaline earth metal sulfate with the compositions of the present invention to remove the scaling deposits. A completion fluid containing at least one alkali metal formate, at least one acid and/or at least one chelating agent, and optionally at least one surfactant or mutual solvent is also described. Methods of removing a filter cake from a well bore surface, which may include weighting agents such as calcium carbonate, is also described, wherein the method includes contacting the filter cake with the completion fluid of the present invention.

50 Claims, No Drawings

FOREIGN PATENT DOCUMENTS

| WO | WO 94/09253 | 4/1994 |
|---|---|---|
| WO | WO 95/21900 | 8/1995 |
| WO | WO 96/31435 | 10/1996 |
| WO | WO 97/26311 | 10/1996 |
| WO | WO 99/48994 | 9/1999 |
| WO | WO 01/59256 A1 | 8/2001 |
| WO | WO 03/012004 | 2/2003 |

OTHER PUBLICATIONS

Hallman, J.H., 8th Annu. Petrol Network Educ. Conf. (PNEC), "Formates in Practice: Field Use and Reclamation," (Houston, Sep. 9-11, 1996), PROC Pap. No. 11, 1996, (13 pp.; 12 Refs.).

Hallman, J.H., Oilchem RES/ACS New Oilfield Chem Techmol Conf (New Orleans, Mar. 29, 1996), PROC Pap. No. 7, 1996, (9 pp; 6 Refs.).

Downs, J.D. et al., 2nd SPE. et al Health, Safety & Environ. in Oil & Gas Prod Int. Conf., "Development of Environment Benign Formate-Based Drilling and Completion Fluids," (Jakarta, Indon., Jan. 25-27, 1994), PROC V 1, pp. 419-428, 1994, (SPE-27143; 11 Refs.).

Hallman, J.H., World Oil, "Formates in Practice: Field Use and Reclamation," V217, No. 10, pp. 81-82, 85-86, 88-90, Oct. 1996, (ISSN 00438790; Color; 12 Refs.).

Baker Hughes INTEQ, "Clear-Drill Clear Brines for Drilling and Completion," Version 3, Jul. 1, 1994, pp. 1-55.

Rice et al., "Conductance and Viscosity of Concentrated Aqueous Salt Solutions at 50.5°," Proc. N.A.S., vol. 39, 1953, pp. 802-811.

Kemp, "Mutual Solubility of Salts in Drilling and Completion Fluids," Society of Petroleum Engineers, 1987, pp. 351-362.

Itkina et al., "HCOOLi-HCOORb-$H_2O$ and $HCOOC_s$-HCOOLi-$H_2O$ Systems at 25°C," Russian Journal of Inorganic Chemistry, vol. 24, pp. 613-618.

N.L. Baroid Industries, "Barabrine," 1983, pp. 1-8.

American Petroleum Institute, "Recommended Practice for Testing Heavy Brines," API Recommended Practice 13J (RP13J), First Edition, Jun. 1, 1986, pp. 1-18.

Hudson et al., "Users' Guide to Weighted Brines," Petroleum Engineer International, Oct. 1986, pp. 33-35.

Downs, "High Temperature Stabilization of Xaniban in Drilling Fluids by the Use of Formate Salts," Physical Chemistry of Collids and Interfaces in Oil Production, 1991, p. 197.

Lobo, "Caesium Formate," and "Potassium Formate," Handbook of Electrolyte Solutions, 1989, pp. 329-330 and 774-779.

Hallman, John H., "Use of Formate-Based Fluids for Drilling and Completion," Offshore, Petroleum Publishing Co., Tulsa, US, vol. 56, No. 8, pp. 63-64:82:84, (Aug. 1, 1996).

International Search Report for PCT/US 02/04366.

U.S. Appl. No. 10/076,209, filed Feb. 14, 2002.

* cited by examiner

COMPOSITIONS FOR CONTROLLING SCALING AND COMPLETION FLUIDS

The benefit of the following U.S. Provisional Patent Applications is hereby made: 60/218,382 filed Jul. 14, 2000; 60/229,691 filed Sep. 1, 2000; and 60/252,200 filed Nov. 21, 2000; all are incorporated herein in their entireties by reference.

BACKGROUND OF THE INVENTION

The present invention relates to the control of scaling deposits, such as alkaline earth metal sulfates, on a surface and compositions which have the capability of controlling alkaline earth metal sulfates on surfaces, and in porous media. The present invention also relates to the drilling industry and more particularly relates to the completion fluids used in the completion of a well for the recovery of hydrocarbons or other materials.

Alkaline earth metal sulfates, such as barium sulfate (also known as barite) are scales frequently seen in oil field operations, most often occurring due to temperature drops occurring in production or in the mixing of incompatible waters from sea water injection. Barium sulfate, unlike carbonate scales, tends to form quickly once saturation conditions are reached and does not readily dissolve in currently available solvents.

The alkaline earth metal sulfates generally form as scales on the surfaces of well bores, perforation tunnels, near well bore regions, the tubing in a well, and other surfaces and eventually can build up to a point where the amount of hydrocarbons being produced from the well is significantly reduced. In the past, a well would have to be shut down in order for the barium sulfate and other alkaline earth metal sulfates to be removed by mechanical and/or chemical treatments. For instance, a mechanical scrubber could be inserted into the well to remove the scaling or chemicals, such as solvents, could be used to remove the scaling. When barium sulfate occurs within a formation, there is no current truly effective treatment for removal. Stimulation of the well is attained by dissolving the rock around the barite. The current technology available for controlling alkaline earth metal sulfate buildup in wells and other surfaces has thus far proved not to be economical due to slow dissolution rates resulting in extended shut in and the need to shut the well in and/or the inability of the current technology to adequately remove a sufficient degree of the alkaline earth metal buildup.

In drilling operations, such as the drilling that occurs in oil field operations, drilling fluids are designed/formulated to serve several functions. These functions include acting as a lubricant to the drill bit to reduce wear and friction during drilling and also to seal the formation surface by forming a filter cake. Currently, in the industry, both oil-based muds (OBMs) and water based muds (WBMs) are typically used. More commonly, synthetic based muds (SBMs) are also used in drilling operations. In the drilling fluid, agents for lubrication will be present as well as weighting materials in order to achieve a density that is typically greater than the surrounding pressure in the well bore. Furthermore, the drilling fluid will also contain a sealing or fluid loss agent, such as calcium carbonate and polymers, in order to form the filter cake on the formation surface of the well bore. In addition, when the drilling fluids are used during drilling, the drilling fluid will also contain drilling fines, such as shale and sandstone fines. During the drilling operations and afterwards, the filter cake seals the formation surface of the well bore so that the well bore can be completely formed without any leakage from the formation surface into the well bore and/or without any leakage of the drilling fluids into the formation surface. While the filter cake is beneficial for these reasons, once the drilling is completed, and the recovery of hydrocarbons is the next step, the filter cake can act as a severe impediment to the recovery of hydrocarbons. For instance, the filter cake can prevent the recovery of hydrocarbons from the formation surfaces which have been blocked or sealed by the filter cake. Furthermore, when injectors are used to retain reservoir pressures, the injection of sea water, for instance, can be significantly reduced due to the filter cake preventing the sea water from entering the formation and hence enhancing recovery of hydrocarbons. This invention preferably refers to wells that are drilled to either recover hydrocarbons or injector wells used for pressure retention in a reservoir which will either use sea water, produce water, or waste water injection such as in disposal wells. In all these cases, it is useful to retain optimum injection or production rates by first removing all remnants of the filter cake first used to drill the well. Accordingly, the industry prefers to remove the filter cake from the well bore in order to optimize productivity. If the filter cake is not removed, the filter cake can block the pores that are part of the formation surface of the well bore which will interfere with the recovery of hydrocarbons. The removal of the filter cake can be even a more difficult problem when the drilling fluid contains barite as the weighting material. Typically, in many drilling operations, the drilling fluid can contain up to 50% by weight of a weighting material such as barite. Barite, also known as barium sulfate, and other alkaline earth metal sulfates are not easily dissolved and are not easily suspended in liquids. Thus, the removal of barite or other alkaline earth metal sulfates that may be present in drilling fluids can be a significant problem. In many drilling operations, the drilling fluid can contain up to 5% by weight of a pore bridging material such as calcium carbonate. Calcium carbonate ($CaCO_3$) is typically a blend of particle sizes with a particle size distribution designed to optimize the bridging of the pores found in the formation. The pore size distribution of the formation is determined from its permeability, preferably by direct porosity and permeability measurements of core plugs extracted from the reservoir.

When the drilling fluid is an oil-based mud, and one that contains pore bridging materials such as calcium carbonate, the ability to displace the oil-based mud and dissolve the filter cake with a completion fluid can be difficult. Typically, the oil-based components of the filter cake must be displaced in order to allow water based completion fluids to contact the surface of the filter cake which typically can contain calcium carbonate. Calcium carbonate, for instance, is best removed by dissolution at a low pH and thus any completion fluid used must have certain properties to be totally effective in removing the filter cake. In other words, an optimum completion fluid is needed which can operate at a low pH, and yet have sufficient density. More preferably, an aqueous-based completion fluid is desired so as to limit any damage to the formation, and more preferably a solids-free material with the minimum of additives would be more preferred in order to avoid any fouling of the well bore.

Once drilling operations have been completed, the well is prepared for the completion operations whereby the mud used for drilling is often displaced by a completion fluid. Completion fluids are typically water based clear fluids and are formulated to the same density as the mud used to drill the well in order to retain the hydraulic pressure on the well bore. There are numerous methods of completing a well, amongst which are open hole completions, pre-drilled, liner, and gravel packed screened systems. The clear fluids are typically halide based brines such as calcium bromide, calcium chloride, and zinc bromide; or organic based brines such as the formate based fluids. While the completion fluid displaces the drilling fluid, the filter cake is still in place and accordingly, there is a need to provide better technology to overcome the above-described problems and preferably to provide technology which can successfully remove the filter cake from the formation surface of the well bore, including any $CaCO_3$, polymer fluid loss agents and/or alkaline earth metal sulfates that may be present as part of the drilling fluid and at the same time retain density in the well bore.

Also, there is a need to provide better technology to overcome the various problems described above, and preferably to provide technology which can avoid the need for a well shut in and so remove scaling deposits, such as alkaline earth metal sulfate buildup.

SUMMARY OF THE PRESENT INVENTION

A feature of the present invention is to provide compositions which are capable of controlling scaling deposits, which can include alkaline earth metal sulfate buildup, on surfaces, such as well bores.

Another feature of the present invention is to provide compositions which dissolve or solubilize scaling deposits, which can include alkaline earth metal sulfates, on surfaces.

A further feature of the present invention is to provide methods to control scaling deposits, which can include alkaline earth metal sulfates, on surfaces.

An additional feature of the present invention is to provide compositions which are capable of removing the filter cake from the well bore surface, wherein the filter cake may include alkaline earth metal sulfates and polymeric sealant or fluid loss additives.

Another feature of the present invention is to provide compositions which dissolve or solubilize alkaline earth metal sulfates which may be part of the filter cake on a well bore surface.

A further feature of the present invention is to provide methods to remove filter cakes from well bore surfaces which can include alkaline earth metal sulfates as part of the filter cake.

A further feature of the present invention is to provide compositions which are capable of removing the filter cake from the well bore surface, wherein the filter cake may include calcium carbonate and polymeric sealant or fluid loss additives.

Another feature of the present invention is to provide compositions which dissolve or solubilize calcium carbonate and/or degrade polysaccharide fluid loss additives which may be part of the filter cake on a well bore surface.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to an aqueous based composition containing cesium formate and at least one chelating agent. Other alkali metal formates can additionally be present.

The present invention further relates to a method to reduce scaling deposits, which can include alkaline earth metal sulfates, present on a surface and involves contacting the surface with an aqueous based composition containing cesium formate and at least one chelating agent.

The present invention, in addition, relates to a method to dissolve scaling deposits, which can include alkaline earth metal sulfates, present on a surface using the above-described compositions.

Furthermore, the present invention relates to a method to reduce scaling, including alkaline earth metal sulfates, present on a surface and involves contacting the surface with an aqueous based composition containing alkali metal formate(s) and at least one chelating agent, wherein the aqueous based composition is introduced while hydrocarbons are being recovered from a well bore.

The present invention further relates to a method to remove a filter cake from a well bore surface, wherein the filter cake can include one or more alkaline earth metal sulfates, and involves contacting the filter cake with an aqueous based composition containing at least one alkali metal formate and at least one chelating agent.

The present invention, in addition, relates to a method to dissolve or solubilize alkaline earth metal sulfates, such as barium sulfate, in a filter cake using the above-described compositions.

The present invention also relates to a completion fluid which contains at least one alkali metal formate and at least one chelating agent. The present invention also relates to a completion fluid which contains at least one alkali metal formate, at least one acid, and preferably at least one surfactant. Additional alkali metal formates, chelating agents, acids, and/or surfactants can be present in the completion fluids as well as conventional additives.

The present invention further relates to a method to remove a filter cake from a well bore surface, wherein the filter cake can include at least one weighting material, and involves contacting the filter cake with an aqueous based composition containing at least one alkali metal formate, at least one acid or chelating agent or both, and preferably at least one surfactant.

The present invention, in addition, relates to a method to dissolve or solubilize weighting material, such as calcium carbonate, in a filter cake using the above-described compositions.

It is to be understood that both the foregoing general description and the following detailed description are exemplary and explanatory only and are intended to provide further explanation of the present invention, as claimed.

DETAILED DESCRIPTION OF THE PRESENT INVENTION

The present invention relates to compositions capable of dissolving or solubilizing scaling deposits, which can include alkaline earth metal sulfates, which are present on surfaces, such as well bores. The present invention further relates to methods to dissolve or remove scaling deposits, which can include alkaline earth metal sulfates, present on surfaces. The present invention also relates to completion fluids for use in drilling and completion operations. The present invention further relates to methods of removing or dissolving filter cakes on the surfaces of well bores after completion of the well.

In one embodiment, the composition of the present invention is an aqueous-based composition which contains cesium formate and at least one chelating agent.

The alkali metal formates are commercially available. For instance, the cesium formate can be obtained from Cabot Corporation. The cesium formate can be made, for instance, by following the description as set forth in International Published Patent Application No. WO 96/31435, incorporated in its entirety by reference herein. The cesium formate that is present in the composition, preferably as a soluble salt, as stated above, can be present in any concentration and the cesium formate solution is a liquid at room temperature. Therefore, the concentration of the cesium formate in the composition can be from about 1% to about 100% by weight and more preferably is present in an amount of from about 40% to about 95% by weight and even more preferably is present in the composition at a range of from about 55% to about 85% by weight or is present in the composition at a range of from about 70% to about 85% by weight. Be sides the chelating agent(s), the remainder of the composition can be water or other aqueous solutions. Other conventional ingredients used in well drilling compositions can be used with the composition of the present invention. Conventional ingredients used in well completion fluids can also be used in the completion fluids of the present invention.

The pH of the cesium formate that is present in the composition can be any pH. Preferably, the pH of the cesium formate is from about 5 to about 13, more preferably from about 7 to about 12, and most preferably from about 9 to about, 12. The cesium formate can have its pH adjusted by standard buffering techniques such as with the use of KOH and/or potassium carbonate or other buffering agents which are compatible with the cesium formate or other alkali metal formate(s).

Other alkali metal formates that can be used in the present invention besides cesium formate are potassium formate and sodium formate which are commercially available. These alkali metal formates can also be prepared in a similar fashion as the cesium formate solution described above, and are also frequently obtained as by-products from ester hydrolysis.

The chelating agent is preferably one or more chelating agents which are compatible with the cesium formate present in the aqueous-based composition. Preferably, the chelating agent is at least partially ionic, such as 10% by weight or more. Preferably, the chelating agent is at least 30% by weight ionic, and more preferably at least 50% by weight ionic, and even more preferably at least 75% by weight ionic, and most preferably is fully ionic. The chelating agent which is preferably ionic can be cationic and/or anionic. The chelating agent can be made ionic by treatments known to those skilled in the art such as treating the chelating agent, which typically has acid groups, with ionic carboxylic groups. Other forms of making the chelating agent ionic include, but are not limited to, reacting the chelating agent with effective amounts of sodium hydroxide, potassium hydroxide, rubidium hydroxide, cesium hydroxide, amine bases such as ammonia, methyl amine, ethylamine, or combinations thereof.

Examples of suitable chelating agents include, but are not limited to, ethylenediamine tetraacetic acid (EDTA), diethylenetriamine pentaacetic acid (DTPA), citric acid, ascorbic acid, salicylic acid, oxalic acid, or combinations thereof. Preferably, the chelating agent is capable of dissolving or solubilizing scaling deposits and preferably scaling deposits which include alkaline earth metal sulfates. In the present invention, preferably the aqueous based composition which contains the cesium formate and at least one chelating agent provide synergistic results with respect to the rate at which the scaling deposits are dissolved or solubilized and/or the completeness at which the scaling deposits are dissolved or solubilized. Generally, once an estimate is made on the amount of scaling deposits present on the surface, a 1:1 molar ratio of the chelating agent to the amount of scalant present can be used in treating the surface to dissolve or solubilize the scaling deposits. Additional amounts or lesser amounts of the aqueous based composition can be used based on routine experimentation in removing or dissolving the scaling which may include the alkaline earth metal sulfates. Mixtures of chelating agents can also be used in the composition of the present invention. In addition, the composition can contain other alkaline metal formates, such as potassium formate.

The cesium formate that is present in the aqueous-based composition is preferably present in an amount of less than 85% by weight on a solution basis. The cesium formate is preferably not fully saturated in the aqueous-based solution so as to permit the chelating agent to solubilize in the solution along with the cesium formate. Preferably, the cesium formate is present in an amount of less than 80% by weight based on a solution basis and more preferably is from about 60% to about 80% by weight.

The cesium formate can be present in any molar amount but is preferably present in an amount of from about 3 M to about 12 M, and more preferably from about 5 M to about 7.5 M. Similarly, the chelating agent can be present in any molar amount, but is preferably present in an amount of from about 0.2 M to about 1.0 M, and more preferably from about 0.5 M to about 0.6 M. Also, the pH of the composition can be any pH as long as the composition is capable of solubilizing or dissolving at least a portion of the scaling deposits, preferably including alkaline earth metal sulfate, present on a surface. Preferably, the pH of the aqueous-based composition is from about 9 to about 14 and more preferably from about 11 to about 13.

Also, the density of the composition can be adjusted to any desired density. This can especially be done with the introduction of other alkali metal formates, such as potassium formate. As an example, when an aqueous-based composition contains cesium formate and at least one chelating agent, the density can range from about 1.9 to about 2.4. This density range can be adjusted with the introduction of potassium formate. For instance, when 0–100 wt % amount of potassium formate is included in the aqueous-based composition, the density of the overall aqueous-based composition can range from about 1.2 to about 2.4. Thus, the density of the aqueous-based composition can essentially be "dialed-in" to meet the density needed for the composition to be introduced into the well bore at the appropriate depth. Discussion of some of the benefits of the aqueous-based compositions for well use are provided below.

The present invention further relates to a method to remove scaling deposits that are present on a surface. With the present invention, the scaling deposits present on a surface can be dissolved or solubilized. Also, with the present invention, the amount of scaling deposits present on a surface can be reduced or controlled. Typically, the scaling deposits, which can include alkaline earth metal sulfate(s), present on a surface will be in the form of scaling. In a preferred embodiment, this scaling occurs on well bores and other surfaces relating to the recovery of hydrocarbons from wells.

The method for removing the scaling deposits on a surface is accomplished by contacting the surface containing the scaling deposits with the above-described composition which contains cesium formate and at least one chelating agent.

The manner in which the composition of the present invention contacts the scaling deposits can be by any means. The composition of the present invention can be injected at the point of the scaling buildup and/or the composition of the present invention can be pumped into the well in order to contact the scaling deposits present in the well bore. In applications outside of the recovery of hydrocarbons, the compositions of the present invention can be sprayed or poured onto the surface having any scaling deposits.

In a preferred embodiment, the method of removing scaling deposits can be accomplished while the well is in operation. In such an embodiment, the composition of the present invention can be introduced, for instance, into the well bore generally at the bottom hole of the well. Moreover, in this embodiment of removing scaling deposits wherein the well is in operation, the aqueous-based composition can include one or more types of alkali metal formates along with at least one chelating agent. In other words, the aqueous-based composition used for this embodiment can be an aqueous-based composition which contains a) at least one type of alkali metal formate, such as potassium formate alone, sodium formate alone, or cesium formate alone along with b) at least one chelating agent. Depending upon the density needed in order to remain at the location where the scaling deposits are located, potassium formate can be used alone along with at least one chelating agent or combinations of various alkali metal formates can be used along with at least one chelating agent. When operating in a live well, the temperature of the well will generally be from about 50° C. or lower to over 250° C. These temperatures will be sufficient to permit the scaling including, if present, the alkaline earth metal sulfates, to be dissolved or solubilized and removed. Generally, the higher the temperature, the faster the rate of dissolving of the scaling deposits. The use of the alkali metal formates permits the aqueous-based compositions to obtain sufficient density necessary to remain in a live well and not be removed along with the recovery of the hydrocarbons and not be removed by any hydrostatic pressure that is built up on the well. The ability of the aqueous-based composition to provide such scaling control meets a need in the industry wherein there are no known commercially available compositions which remove scalants by such a process while a well is in operation.

Generally, the compositions of the present invention can be introduced by a coil tubing which fits inside the production tubing of a well. This coil tubing can be inserted such that it can reach any point of the well and preferably reaches to the bottom of the well where the compositions of the present invention can be pumped and/or jetted into the well bore. The density of the compositions of the present invention should be such that the composition remains at the location where it was introduced. With the proper density, the oil or other hydrocarbons being recovered can be pumped or forced to the surface without substantially taking along the compositions of the present invention. Over time, the rate of the dissolution of the compositions of the present invention will decrease by being contacted with the oil and any other water being released during recovery of the hydrocarbons. This will eventually dilute the compositions such that the composition is eventually pumped to the surface along with the recovery of hydrocarbons to the surface. Once recovered at the surface, the composition of the present invention will separate from the hydrocarbon, such as oil, by the separation of water/oil phases. The scaling, like barium sulfate, which has been dissolved or solubilized by the composition of the present invention will precipitate out of solution due to the lowering of temperature at the surface of the well. Accordingly, the recovery of hydrocarbons is not affected by the use of the composition of the present invention and the scaling, like barium sulfate, is quite easily separated as well.

In a preferred embodiment, the temperature of the well which is generally 50° C. or higher and can reach 200° C. or higher will permit the dissolving or solubilizing of the scaling deposits by the compositions of the present invention.

For purposes of the present invention, the rate of dissolution can be controlled depending on the specific formate(s) and chelating agent(s) used and/or the temperature where the scaling is occurring. If necessary, the aqueous-based composition can be heated before or while contacting a surface to reach optimum dissolving temperatures.

The amount of the composition of the present invention for purposes of removing scaling deposits is an amount sufficient to remove the scaling deposits. Preferably, this amount is from about 3 to about 0.5, and more preferably from about 1.5 to about 1.0, which is based on moles of chelant per moles of scale.

The methods of the present invention can also be used in a well which is being worked over and therefore shutdown. In such a method, again, the compositions of the present invention can be introduced into the well bore at any point or pumped into the entire well. The compositions of the present invention can be introduced with pressure applied so as to flow the compositions of the present invention not only into the well bore but also into the surrounding formation and therefore the compositions of the present invention will not only remove scaling present on the well bore but also in the formation where the well was originally drilled into. This process is typically known as a "squeeze" treatment.

As indicated above, the compositions of the present invention used for removing scaling deposits is preferably accomplished in high temperatures, such as 50° C. or higher.

For purposes of the present invention, scaling deposits includes any type of mineral compound buildup on a surface, such as calcium carbonates, alkaline earth metal sulfates, sulfide compounds, iron scales, and the like. For purposes of the present invention, the removing or dissolving of scaling deposits would involve the removal of at least one type of the scale and preferably a majority if not all of the various types of scales that are on a surface, especially the type of scaling that occurs in well bores. Alkaline earth metal sulfate includes barium sulfate and other sulfates such as strontium sulfate and calcium sulfate, or combinations thereof.

With respect to the completion fluids, in one embodiment, the completion fluid of the present invention is preferably an aqueous-based composition which contains at least one alkali metal formate and at least one chelating agent. Preferably, the completion fluid contains cesium formate as the alkali metal formate. More preferably, the completion fluid contains two or more alkali metal formates where preferably one of the alkali metal formates is cesium formate. A preferred combination of formates includes, but is not limited to, cesium formate with potassium formate. The chelating agent is preferably one or more chelating agents which are compatible with the alkali metal formate(s) present in the completion fluid. Preferably, the chelating agent is at least partially ionic, such as 10% by weight or more. Preferably, the chelating agent is at least 30% by weight ionic, and more preferably at least 50% by weight ionic, and even more preferably at least 75% by weight ionic, and most preferably is fully ionic. The chelating agent which is preferably ionic can be cationic and/or anionic. The chelating agent can be made ionic by treatments known to those skilled in the art such as treating the chelating agent, which typically has acid groups, with ionic carboxylic groups or the like. Other forms of making the chelating agent ionic include, but are not limited to, reacting the chelating agent with effective amounts of hydroxides, such as, but not limited to, sodium hydroxide, potassium hydroxide, rubidium hydroxide, cesium hydroxide; amine bases such as, but not limited to, ammonia, methyl amine, ethylamine; or combinations thereof.

Examples of suitable chelating agents include, but are not limited to, ethylenediamine tetraacetic acid (EDTA), diethylenetriamine pentaacetic acid (DTPA), citric acid, ascorbic acid, salicylic acid, oxalic acid, or combinations thereof. Preferably, the chelating agent is capable of dissolving or solubilizing the filter cake, a portion thereof, and/or alkaline earth metal sulfates in the filter cake. In the present invention, preferably the aqueous based completion fluid which contains at least one alkali metal formate and at least one chelating agent provides synergistic results with respect to the rate at which the filter cake is dissolved or solubilized and/or the completeness at which the filter cake is dissolved or solubilized. Generally, once an estimate is made on the amount of filter cake present on the well bore surface, a 1:1 molar ratio of the chelating agent to the amount of alkaline earth metal in the filter cake present can be used in treating the well bore surface to dissolve or solubilize the filter cake. Additional amounts or lesser amounts of the aqueous based completion fluid can be used based on routine experimentation in removing or dissolving the filter cake which may include alkaline earth metal sulfates. Mixtures of chelating agents can also be used in the completion fluids of the present invention.

As an option, one or more surfactants and/or mutual solvents can be included in the completion fluids of the present invention. A surfactant or mutual solvent is particularly preferred when the completion fluid is used after an OBM or SBM drilling fluid. The surfactant or mutual solvent is preferably one which is capable of suspending or emulsifying the oil-based components of the OBM or SBM; thus allowing the formate and chelant to reach the alkaline earth metal sulfates, such as barium sulfate, in order to solubilize the alkaline earth metal sulfates as described above. The surfactant and/or mutual solvent(s) can also be used in the completion fluids of the present invention when a synthetic based mud or water based mud is used as the drilling fluid. A variety of different surfactants and/or mutual solvents can be used in the present invention. Examples of surfactants or mutual solvents that can be used in the completion fluids of the present invention include, but are not limited to, sodium and ammonium salts of acrylic acid copolymers, including copolymers containing adducts of ethylene oxide and propylene oxide; hydroxyethylethylene urea and polymeric species thereof, and more preferably mixtures of these two classes of surfactant/mutual solvent types. Typically, the amount of surfactant or mutual solvent is an amount effective to emulsify or suspend the oil-based components of the OBM. Preferred amounts include from about 0.5 to about 20% by weight of the completion fluid, and more preferably from about 5 wt % to about 10 wt % based on the weight of the completion fluid.

The alkali metal formate that is present in the completion fluid is preferably present in an amount of less than 85% by weight on a solution basis. The alkali metal formate is preferably not fully saturated in the aqueous-based solution so as to permit the chelating agent to solubilize in the solution along with the alkali metal formate. Preferably, the alkali metal formate is present in an amount of less than 80% by weight based on a solution basis and more preferably is from about 60% to about 80% by weight.

The alkali metal formate, such as cesium formate, can be present in any molar amount in the completion fluid, and is preferably present in an amount of from about 3 M to about 12 M, and more preferably from about 5 M to about 7.5 M. Similarly, the chelating agent can be present in any molar amount, and is preferably present in an amount of from about 0.2 M to about 1.0 M, and more preferably from about 0.5 M to about 0.6 M. Also, the pH of the composition can be any pH as long as the composition is capable of solubilizing or dissolving at least a portion of the filter cake which may include at least one alkaline earth metal sulfate, particularly barite. Preferably, the pH of the completion fluid is from about 9 to about 14, and more preferably from about 11 to about 13. Additionally, filter cakes often contain insoluble polysaccharides which can be solubilized or dispersed or flocculated at high pH with the use of the completion fluids of the present invention.

Also, the density of the completion fluid can be adjusted to any desired density. This can especially be done with the introduction of a combination of alkali metal formates, such as potassium formate with cesium formate. As an example, when an aqueous-based completion fluid contains cesium formate and at least one chelating agent, the density can preferably range from about 1.9 to about 2.4. This density range can be adjusted with the introduction of potassium formate. For instance, when 0–100% by weight of potassium formate is included in the aqueous-based completion fluid, the density of the overall aqueous-based completion fluid can range from about 1.2 to about 2.4. Thus, the density of the aqueous-based completion fluid can essentially be "dialed-in" to meet the density needed for the completion fluid to be introduced into the well bore at the appropriate depth. For lower density ranges, sodium formate can be added to potassium formate, hence, "dialing-in" lower density completion fluids.

Depending upon the density needed for the completion fluid in order to reach and/or remain at the location where the filter cake is located, potassium formate can be used alone along with at least one chelating agent or combinations of various alkali metal formates can be used along with at least one chelating agent. Generally, the temperature of the well which is generally 50° C. or higher and can reach 200° C. or higher, will permit the completion fluid to remove the filter cake especially when the filter cake contains at least one alkaline earth metal sulfate. Alkaline earth metal sulfate includes barium sulfate and/or other sulfates such as strontium sulfate and calcium sulfate, or combinations thereof.

The temperatures of the well will generally be sufficient to dissolve or solubilize any alkaline earth metal sulfates that may be present in the filter cake along with the removal of the sealing agents, also known as fluid loss agents, such as calcium carbonate or other components used in the drilling fluid and which primarily form the filter cake. For purposes of the present invention, the rate of dissolution of the filter cake, especially when the filter cake contains one or more alkaline earth metal sulfates, can be controlled depending on the specific formate(s) and chelating agent(s) used and/or the temperature where the filter cake is located in the well bore. If necessary, the completion fluid can be heated before or while contacting a filter cake surface to reach optimum dissolving temperatures. Heat can be applied to the solution by direct thermal methods, microwave, ultrasonic methods, or other heat transfer techniques.

Accordingly, the present invention further relates to a spent completion fluid which contains at least one alkali metal formate, at least one chelating agent, and at least a portion of a dissolved or solubilized filter cake. The filter cake can contain a fluid loss agent, drilling fines, one or more alkaline earth metal sulfates, other conventional ingredients, and combinations thereof.

The amount of the completion fluid of the present invention used for purposes of removing the filter cake is an amount sufficient to remove the filter cake located on the well bore. Preferably, this amount is from about 3 to about 0.5 and more preferably from about 1.5 to about 1.0, which is based on moles of chelating agent per moles of alkaline earth metal in the filter cake. The completion fluid of the present invention can be introduced into the well bore by any conventional technique, such as, but not limited to, being pumped and/or jetted into the well bore by conventional techniques or with coiled tube operations, bullheading, or using gas lift mandrels.

In another embodiment, the completion fluid of the present invention is preferably an aqueous-based composition which contains at least one alkali metal formate, at least one acid, and preferably at least one surfactant. Preferably, the completion fluid contains cesium formate as the alkali metal formate. More preferably, the completion fluid contains two or more alkali metal formates, where preferably one of the alkali metal formates is cesium formate. A preferred combination of formates includes, but is not limited to, cesium formate with potassium formate. Other combinations of alkali metal formates can be used, such as sodium formate and potassium formate, or sodium formate and cesium formate.

With respect to the acid used in the completion fluids of the present invention, one or more acids can be present in the completion fluid of the present invention. The acid is preferably capable of dissolving at least one pore bridging material partially or completely. Preferably, the acid is capable of dissolving calcium carbonate. Further, the acid is preferably an acid containing at least one carboxylic group and more preferably is formic acid or an acid derivative thereof. Other examples of acids that can be used include, but are not limited to acetic acid, ascorbic acid, citric acid, tartaric acid, phthalic acid, glycolic acid, and combinations thereof. The acid is present in an amount sufficient to preferably dissolve at least partially the filter cake and more preferably the calcium carbonate. Preferred amounts of the acid that are present in the composition are from about 1 wt % to about 50 wt %, and more preferably from about 5 wt % to about 25 wt % based on the weight of the completion fluid.

The formate anion is a weak base that in the presence of a proton source (acid) is neutralized to produce formic acid, as shown in Equation 1.

(1)

The pKa value for formic acid is 3.75. In practical terms, this means that at a pH of about 3.75, formic acid and formate anion will exist in a 1/1 molar ratio. When the pH of a formate solution is raised or lowered one unit from this value, the ratio of formate to formic acid changes by approximately 10 as shown in Table 1.

TABLE 1

Formate/Formic Acid as a Function of pH*

| pH | Approximate Ratio of Formate/Formic Acid |
|---|---|
| 6.75 | 1000 |
| 5.75 | 100 |
| 4.75 | 10 |
| 3.75 | 1 |
| 2.75 | 0.1 |
| 1.75 | 0.01 |
| 0.75 | 0.001 |

*potentiometric pH readings are carried out on 1/10 formate solutions diluted with deionized water The acid can be present in any molar amount, but is preferably present in an amount of from about 0.2 M to about 15 M, and more preferably from about 1.5 M to about 7.5 M. Also, the pH of the composition can be any pH as long as the composition is capable of solubilizing or dissolving at least a portion of the filter cake which may include calcium carbonate and/or at least one alkaline earth metal sulfate, particularly barite. Preferably, in this embodiment the pH of the completion fluid is from about 2 to about 7, and more preferably from about 3 to about 6.

Depending upon the density needed for the completion fluid in order to reach and/or remain at the location where the filter cake is located, potassium formate can be used alone along with at least one acid or combinations of various alkali metal formates can be used along with at least one acid. Generally, the temperature of the well which is generally 50° C. or higher and can reach 200° C. or higher, will permit the completion fluid to remove the filter cake especially when the filter cake contains calcium carbonate.

The degree to which the acid contacts the carbonate is generally more important than temperature of the well. The temperature of the well will generally be sufficient to dissolve or solubilize any calcium carbonate that may be present in the filter cake along with the removal of the sealing agents, also known as fluid loss agents, used in the drilling fluid and which primarily form the filter cake. For purposes of the present invention, the rate of dissolution of the filter cake can be controlled depending on the specific formate(s) and acid(s) used and/or the temperature where the filter cake is located in the well bore. If necessary, the completion fluid can be heated before or while contacting a filter cake surface to reach optimum dissolving temperatures. Heat can be applied to the solution by direct thermal methods, microwave, ultrasonic methods, or other heat transfer techniques.

Accordingly, the present invention further relates to a spent completion fluid which can contain at least one alkali metal formate, at least one acid, at least one neutralized acid, and/or at least a portion of a dissolved or solubilized filter cake, and preferably at least one surfactant and/or mutual solvent. The filter cake can contain a fluid loss agent, drilling fines, weighting agents, drilling polymers, calcium carbonate, other conventional ingredients, and/or combinations thereof.

The spent completion fluid can be recycled, for instance, by raising the pH of the fluid to a pH range of from about 10.5 to about 12 using a metal salt, such as, but not limited to, sodium hydroxide, potassium hydroxide, and/or cesium hydroxide. The fluid, by this procedure precipitates divalent ions, such as Ca, and once the fluid is filtered, the formate fluid is reclaimed and now reusable.

The amount of the completion fluid of the present invention for purposes of removing the filter cake is an amount sufficient to remove the filter cake located on the well bore. Preferably, this amount is from about 6 to about 1, and more preferably from about 3 to about 2, which is based on moles of acid per moles of calcium carbonate in the filter cake.

The completion fluids of the present invention can be introduced into the well bore by any conventional technique, such as, but not limited to, being pumped and/or jetted into the well bore by conventional techniques or with coiled tubing operations, bullheading, or after gravel packed screens have been installed.

Over time, the completion fluid, once the well is in operation will be brought to the surface with the recovery of hydrocarbons or water from injection from the well. Once recovered at the surface, the completion fluid of the present invention will separate from the hydrocarbon, such as oil, by the separation of water/oil phases. The components of the filter cake, such as barium sulfate, if present, which has been dissolved or solubilized by the completion fluid of the present invention will precipitate out of solution due to the lowering of temperature at the surface of the well. The activity of the surfactant is less at surface temperature than formation temperature. Also, raising the pH of the solution will precipitate out the ingredients of the filter cake. Accordingly, the recovery of hydrocarbons is not affected by use of the completion fluids of the present invention and the components of the filter cake can be easily separated as well. Further, the formate based fluid can be recovered and removed.

Accordingly, the present invention further relates to a method to remove a filter cake that is present in a well bore. The method for removing the filter cake on the well bore surface is accomplished by contacting the filter cake with one or more of the above-described completion fluids of the present invention in the manner described above.

For purposes of the present invention, the completion fluid can contain a) at least alkali metal formate and b) at least one chelating agent or at least one acid, or both. Spent completion fluids containing at least these ingredients and methods, as disclosed above, of using these completion fluids and recycling them are also part of the present invention.

The completion fluids of the present invention and their use in removing the filter cake on a well bore surface provide a number of advantages over conventional completion fluids. First of all, the completion fluids of the present invention can have a variety of densities to efficiently and effectively be introduced and remain in the well bore in order to remove the filter cake. Further, with the completion fluids of the present invention, no corrosion inhibitors are needed since in one embodiment, preferably no acids are in the completion fluids of the present invention. Thus, damage to the well formation can be avoided. Furthermore, the completion fluids of the present invention preferably have a high pH which again is advantageous since low pH fluids which contain corrosion inhibitors can be damaging to the well formation. In addition, the completion fluids of the present invention can remove alkaline earth metal sulfates that may be present as part of the filter cake or be trapped by the filter cake. Thus, the completion fluids of the present invention and the methods of removing filter cakes using the completion fluids of the present invention provides numerous advantages over conventional completion fluids.

The present invention will be further clarified by the following examples, which are intended to be purely exemplary of the present invention.

EXAMPLES

Various completion fluid formulations were prepared and tested to determine the ability of the completion fluids to remove filter cake. Two laboratory barrels of oil-based mud formulation were prepared by normal mud protocols well known to those skilled in the art, following API procedures 13-B1(RR and 13B-1) and 13-J. This oil-based mud was run in a high temperature, high pressure (HTHP) filtration cell at 250° F. and was run at this temperature until filter cakes were built up on the surface of the filter paper. The filter cakes were formed on filter paper so that the filter paper with the filter cake on it could be added to the various completion fluid formulations identified as sample numbers 1–6. The various ingredients for each of these formulations are set forth in the Table below. Various observations were made when the filter cake with filter paper was added into the completion fluids of sample nos. 1–6 at 150° F. with stirring being accomplished by a magnetic stirrer. Sample nos. 1, 2, 3, and 6 successfully solubilized the filter cake. Sample nos. 2 and 6 were considered the most successful in solubilizing completely the filter cake and this is believed to be based on a sufficient amount of surfactant being present in the formulation.

The specific surfactant used was a two part mixture of ethylene oxide/propylene oxide adducts of acrylate copolymers and polymeric hydroxyethylethylene urea, in a weight ratio of 1:9 to 9:1, more preferably 3 to 2.

TABLE 1

| Sample # | 1 | 2 | 3 | 4 | 5 | 6 |
|---|---|---|---|---|---|---|
| Surfactant wt % | 5 | 7.5 | 0 | 7.5 | 0 | 10 |
| Formic Acid wt % | 5 | 5 | 0 | 0 | 5 | 5 |
| Potassium Formate wt % (1.57 sg.) | 53 | 48.5 | 69.6 | 55.95 | 62.15 | 43.985 |
| Cesium Formate wt % (2.2 s.g.) | 37 | 39 | 30.4 | 36.55 | 32.85 | 41.015 |
| Weight lb/gal | 14.52 | 14.54 | 14.52 | 14.57 | 14.6 | 14.6 |
| pH (1:10 dilution) | 4.7 | 4.75 | 9.85 | 7.55 | 4.75 | 4.70 |
| OBM filter cake 75° F. | no reaction | no reaction | no reaction | no reaction | no reaction | no reaction |
| 150° F. mag. stirrer | Soluble | Soluble | No Reaction | Soluble | No Reaction | Soluble |
| Observations | Noticeable pieces of filter cake Disperses | Appears to go into solution Oil floats on | | Noticeable pieces of filter cake | | Appears to go into solution Oil floats |

TABLE 1-continued

| Sample # | 1 | 2 | 3 | 4 | 5 | 6 |
|---|---|---|---|---|---|---|
| | when shaken | surface when stopped | | | | on surface when stopped |

TABLE 2

5 wt % Surfactant, 0 wt % formic acid    14.59785

| Specific gravity | 14.5 lb/gal fluid | 100 mls grams | Volume | 1 bbl grams | volume |
|---|---|---|---|---|---|
| 1 | 7.5 wt % surfactant | 7.5 | 7.5 | 26.25 | 26.25 |
| 1.22 | 5 wt % formic acid | 0 | 0 | 0 | 0 |
| 1.574 | potassium formate | 88.0653 | 55.95 | 308.2286 | 195.825 |
| 2.18 | cesium formate | 79.679 | 36.55 | 278.8765 | 127.925 |
| 1.740696 | total | 175.2443 | 100 | 613.3551 1.752443 s.g. | 350 (actual) |

TABLE 3

0 wt % Surfactant, 5 wt % formic acid    14.62224

| Specific gravity | 14.5 lb/gal fluid | 100 mls grams | volume | 1 bbl grams | volume |
|---|---|---|---|---|---|
| 1 | 7.5 wt % surfactant | 0 | 0 | 0 | 0 |
| 1.22 | 5 wt % formic acid | 6.1 | 5 | 21.35 | 17.5 |
| 1.574 | potassium formate | 97.8241 | 62.15 | 342.3844 | 217.525 |
| 2.18 | cesium formate | 71.613 | 32.85 | 250.6455 | 114.975 |
| 1.740696 | total | 175.5371 | 100 | 614.3799 1.755371 s.g. | 350 |

TABLE 4

10 wt % Surfactant, 5 wt % formic acid    14.55627

| Specific gravity | 14.5 lb/gal fluid | 100 mls Grams | volume | 1 bbl Grams | volume |
|---|---|---|---|---|---|
| 1 | 10 wt % surfactant | 10 | 10 | 35 | 35 |
| 1.22 | 5 wt % formic acid | 6.1 | 5 | 21.35 | 17.5 |
| 1.574 | potassium formate | 69.23239 | 43.985 | 242.31 | 153.95 |
| 2.18 | cesium formate | 89.4127 | 41.015 | 312.94 | 143.55 |
| 1.740696 | total | 174.7451 | 100 | 611.6078 1.747451 s.g. | 350 (actual) |

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An aqueous-based composition comprising from about 40% to about 95% by weight cesium formate and at least one chelating agent, wherein said at least one chelating agent is present in an amount of from about 0.2 M to about 1.0 M, and wherein said aqueous-based composition has a pH of from 9 to about 14.

2. The composition of claim 1, wherein said chelating agent is at least partially ionic.

3. The composition of claim 1, wherein said chelating agent is anionic.

4. The composition of claim 1, further comprising potassium formate.

5. The composition of claim 1, wherein said pH of said composition is from about 11 to about 13.

6. The composition of claim 1, wherein said chelating agent is diethylenetriainine pentaaeetie acid optionally having carboxylate anions.

7. The composition of claim 1, wherein said composition has a specific gravity of from about 1.2 to about 2.4.

8. The composition of claim 1, wherein said aqueous-based composition is less than fully saturated with said cesium formate.

9. A method to reduce alkaline earth metal sulfate present on a surface comprising contacting said alkaline earth metal sulfate with the composition of claim 1.

10. The method of claim 9, wherein said alkaline earth metal sulfate is present on a well bore surface.

11. The method of claim 10, wherein said composition is introduced at the bottom hole of the well bore.

12. The method of claim 10, wherein said composition is introduced while recovery of hydrocarbons is occurring from said well bore.

13. The method of claim 10, wherein said composition reaches a temperature of at least 50° C. in the presence of said alkaline earth metal sulfate.

14. The method of claim 10, wherein said composition and dissolved alkaline earth metal sulfate are recovered.

15. The method of claim 12, wherein said composition and dissolved alkaline earth metal sulfate are recovered from the well bore at the surface of the well and wherein said composition separates from the hydrocarbons by phase separation and said alkaline earth metal sulfate precipitates out of solution.

16. A method to remove scaling deposits present on a well bore surface comprising contacting said scaling deposits with the aqueous-based composition of claim 1, wherein said composition is introduced while recovery of hydrocarbons is occurring from said well bore.

17. The method of claim 16, wherein said aqueous-based composition further comprises potassium formate.

18. The method of claim 16, wherein said composition and dissolved scaling deposits are recovered from the well bore at the surface of the well and wherein said composition separates from the hydrocarbons by phase separation and at least a portion of said scaling deposits precipitate out of aqueous solution.

19. The method of claim 16, wherein the cesium formate is present in an amount of from about 3 M to about 12 M and said at least one chelating agent is present in an amount of from about 0.2 to about 1.0 M.

20. The method of claim 16, wherein said chelating agent is diethylenetriamine pentaacetic acid optionally having carboxylate anions.

21. A completion fluid comprising at least one alkali metal formate, at least one acid, at least one surfactant and optionally at least one chelating agent, wherein said at least one alkali metal formate is present in an amount of from about 40% to about 95% by weight, and said at least one acid is present in an amount of from about 0.2 M to about 12 M, wherein said alkali metal formate comprises cesium formate.

22. The completion fluid of claim 21, wherein said alkali metal formate comprises cesium formate and potassium formate.

23. The completion fluid of claim 21, wherein said acid is formic acid or an acid derivative thereof.

24. The completion fluid of claim 21, further comprising a mutual solvent.

25. The completion fluid of claim 21, wherein said surfactant comprises a mixture of an ethylene oxide/propylene oxide adduct of an acrylate copolymer, polymeric hydroxyethylethylene urea, monobutyl ethylene glycol, ethoxylated long chain alcohols, sulfated long chain alcohols, or combinations thereof.

26. The completion fluid of claim 21, wherein said completion fluid has a specific gravity of from about 1.2 to about 2.4.

27. A spent completion fluid comprising at least one alkali metal formate, at least one acid, at least one surfactant, and a dissolved or solubilized filter cake, and optionally, at least one chelating agent, wherein said at least one alkali metal formate is present in an amount of from about 40% to about 95% by weight, and said at least one acid is present in an amount of from about 0.2 M to about 12 M.

28. The spent completion fluid of claim 27, wherein said filter cake comprises a fluid loss agent.

29. The spent completion fluid of claim 27, wherein said filter cake comprises calcium carbonate or at least one alkaline earth metal sulfate or both and optionally at least one fluid loss agent.

30. The spent completion fluid of claim 27, wherein said filter cake further comprises drilling fines.

31. The spent completion fluid of claim 27, wherein said alkali metal formate comprises cesium formate.

32. The spent completion fluid of claim 27, wherein said alkali metal formate comprises cesium formate and potassium formate.

33. The spent completion fluid of claim 27, wherein said alkali metal formate comprises potassium formate.

34. The spent completion fluid of claim 27, wherein said acid comprises formic acid or an acid derivative thereof.

35. The spent completion fluid of claim 27, wherein said surfactant comprises a mixture of a ethylene oxide/propylene oxide adduct of an acrylate copolymer and polymeric hydroxyethylethylene urea.

36. A method to remove a filter cake present on a well bore surface comprising contacting said filter cake with the completion fluid of claim 21.

37. The method of claim 36, wherein said filter cake comprises a fluid loss agent.

38. The method of claim 36, wherein said filter cake comprises calcium carbonate, at least one alkaline earth metal sulfate, at least one fluid loss agent, or combinations thereof.

39. The method of claim 36, wherein said filter cake further comprises drilling fines.

40. The method of claim 36, wherein said completion fluid and dissolved or solubilized filter cake are recovered.

41. The method of claim 36, wherein said completion fluid and dissolved or solubilized filter cake are recovered from the well bore at the surface of the well during recovery of hydrocarbons and wherein said completion fluid separates from the hydrocarbons by phase separation and said filter cake or a portion thereof precipitates out of solution.

42. The method of claim 36, wherein said alkali metal formate comprises cesium formate, potassium formate, or both.

43. The method of claim 36, wherein the alkali metal formate is present in an amount of from about 3 M to about 12 M and said at least one acid is present in an amount of from about 0.2 M to about 12 M.

44. The method of claim 40, further comprising raising the pH of the spent completion fluid to a pH range of from about 10.5 to about 12 and filtering said spent completion fluid.

45. The completion fluid of claim 21, wherein the alkali metal formate is present in an amount of from about 3 M to about 12 M and said at least one chelating agent is present in an amount of from about 0.2 M to about 1.0 M.

46. The completion fluid of claim 21, wherein said chelating agent is at least partially ionic.

47. The completion fluid of claim 21, wherein said chelating agent is diethylenetriamine pentaacetic acid optionally having carboxylate anions.

48. The spent completion fluid of claim 27, wherein the alkali metal formate is present in an amount of from about 3 M to about 12 M and said at least one chelating agent is present in an amount of from about 0.2 M to about 1.0 M.

49. The method of claim 36, wherein the alkali metal formate is present in an amount of from about 3 M to about 12 M and said at least one chelating agent is present in an amount of from about 0.2 M to about 1.0 M.

50. The completion fluid of claim 21, wherein said surfactant comprises at least one sodium or ammonium salt of acrylic acid copolymer, optionally containing one or more alkylene oxide adducts.

* * * * *